US006929854B2

(12) United States Patent
Wasylciw

(10) Patent No.: US 6,929,854 B2
(45) Date of Patent: Aug. 16, 2005

(54) METHODS OF STRAW FIBER PROCESSING

(75) Inventor: Wayne Wasylciw, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 341 days.

(21) Appl. No.: 10/221,999

(22) PCT Filed: Apr. 3, 2002

(86) PCT No.: PCT/CA02/00455

§ 371 (c)(1), (2), (4) Date: Sep. 19, 2002

(87) PCT Pub. No.: WO02/081160

PCT Pub. Date: Oct. 17, 2002

(65) Prior Publication Data

US 2003/0160349 A1 Aug. 28, 2003

(30) Foreign Application Priority Data

Apr. 3, 2001 (CA) ............................................ 2342688

(51) Int. Cl.$^7$ .......................... B32B 9/04; B32B 21/04; B29C 59/00

(52) U.S. Cl. ....................... 428/332; 428/485; 428/532; 428/537.1; 264/112; 264/115; 264/122

(58) Field of Search ................................ 428/332, 485, 428/532, 537.1; 264/112, 115, 122

(56) References Cited

U.S. PATENT DOCUMENTS

| | | | | |
|---|---|---|---|---|
| 2,388,592 A | | 11/1945 | Asplund et al. | |
| 5,656,129 A | | 8/1997 | Good et al. | |
| 6,346,165 B1 | * | 2/2002 | Markessini et al. | 156/296 |

FOREIGN PATENT DOCUMENTS

| | | |
|---|---|---|
| WO | WO 91/12367 | 8/1991 |
| WO | WO 99/02318 | 1/1999 |
| WO | WO 00/25998 | 5/2000 |

* cited by examiner

*Primary Examiner*—Stephen J. Lechert, Jr.
(74) *Attorney, Agent, or Firm*—Bennett Jones LLP

(57) ABSTRACT

A method of producing boards or panels from cereal straw includes the steps of treating and mechanically refining the straw with steam under elevated pressure which may be in excess of 8 bar (800 kPa). The resulting fiber may then be pressed in to boards or panels without added binder or mixed with a urea formaldehyde or melamine urea formaldehyde binder.

15 Claims, 1 Drawing Sheet

METHODS OF STRAW FIBER PROCESSING

FIELD OF THE INVENTION

The present invention relates to methods of processing straw to obtain fibres useful for board or panel production such as medium density fibreboard ("MDF") and particleboard.

BACKGROUND OF THE INVENTION

The incompatibility of urea-formaldehyde (UF), including melamine urea formaldehyde ("MUF"), based binders with cereal straws is reflected in current commercial ventures making panels from these materials. All conventional prior art strawboard plants use methyl diphenyl isocyanate ("MDI") as the binder in an effort to make particleboard and MDF. While MDI is an excellent binder, which imparts superior properties to panels, MDI has some inherent disadvantages, including its high cost, for non-wood non-structural panels.

One significant disadvantage is the tendency of MDI to adhere to press platens during the pressing process. A variety of release techniques are available to overcome the bonding of MDI to press platens, such as release agents and release papers. However, when compared to UF-based resins, the use of internal and external release agents and release papers is expensive and add to the cost of the end product. Another often overlooked deficiency of MDI, when used in combination with cereal straws, is lack of mat tack which is a critical issue in the preparation of straw based non-structural panels.

Lower binder costs, lower process costs, increased ease of implementation and better mat integrity all provide the incentive to use UF-based binders with straw in panels. The barrier has been the inability to bond UF binders with straw to exceed minimum commercial standards.

There have been various theories proposed on why UF does not bond with straw in composite panels. Incompatibilities between a straw's waxy epicuticular layer and water-based resins, straw silica content and straw chemical reactivity, separately or in unison, are believed to be the reasons why UF based resins cannot be effectively used with straw. However, straw-UF bonding knowledge is somewhat limited according to published reports.

A series of studies conducted at Oregon State University (Groner and Barbour, 1971, 1972, 1973) found that MDI was the most effective binder with straw and that binder effectiveness could be increased by chemically stripping the wax from straw. Such a gain in bondability was at the expense of thickness swell, however. In the establishment of commercial straw panel board plants, subsequent piloting trials have demonstrated in practice that MDI is superior in performance over UF. This further reinforces the idea of UF-straw incompatibility. This idea is so widely held that there are no commercial straw panel ventures that presently use UF resins.

Research conducted at Washington State University indicated that pressure refined straw displayed increased UF resin bondability over hammermilled straw (Sauter, 1995). The results were still well below the commercial standard however. Of note was the change in buffering capacity of straw to something more closely resembling the buffering capacity of wood, when the straw was pressure refined. This decrease in the straw buffering capacity was postulated to be the most likely reason why increased UF bonding was encountered. The mechanism causing this change in buffering capacity was considered to be the development of weak acids in the refining process.

A chemi-thermomechanical treatment was disclosed in WO99/02318 (Nakos) whereby an acid (or alkaline) wash is applied to the straw. It is claimed the wax and silica are removed from the straw by the combined chemical and mechanical action thus facilitating the UF bonding process. Again, the results indicated improvement in bond only but not exceptional bonding performance, nor sufficient bonding performance to meet commercial standards.

In U.S. Pat. No. 5,656,129, a method of producing straw fibre is disclosed which utilizes a steam contacting and steam pressure refining steps. Steam pressures up to 100 psig (6.89 bar) are disclosed while pressures of 40 to 75 psig (2.76 to 5.17 bar) are preferred. In the prior art, pressures above about 6 bar are not taught because of two reasons. First, the darkening of the fibre results in end products which are cosmetically unsuitable. Second, it is known that straw fibre length decreases as steam refining pressure increases, which is not considered desirable.

Therefore there is a need in the art for improved methods of processing cereal straws to form panels using UF and MUF resins, because of the potential advantages of using UF and MUF resins.

SUMMARY OF THE INVENTION

The applicant has previously found that acid treatment of hammermilled and atmospherically refined straw results in improved UF and MUF bonding. Without being limited to a theory, we believe the role of the acid is most likely a chemical modifier rather than a wax/silica stripper. The present invention is based on the unexpected discovery that high pressure steam refining of straw fibre permits bonding with UF or MUF binders and also permits the use of the straw fibre in binderless panels. Although pressure refining of straw has been proposed in the prior art, the beneficial results obtained at the extremely high pressures proposed in the present invention have not been previously discovered.

Therefore, the present invention is directed to alternative methods of processing straw to obtain fibres useful for board or panel production such as, but not limited to, medium density fibreboard ("MDF") and particleboard, using UF and MUF resins, or without binders. In particular, the invention may comprise a method of processing straw including a steam-contacting step under elevated pressure followed by pressurized mechanical refining of the straw. The straw may then be blended of the resulting straw fibre with UF or MUF resins, or without binders, and pressed into boards or panels.

In one aspect, the invention comprises a method of producing boards or panels comprising cereal straw, said method comprising the steps of:

(a) hammermilling the straw, preferably but not necessarily to lengths less than about 50 mm and more preferably to lengths less than about 25 mm;

(b) treating the straw with steam under elevated pressure;

(c) mechanically refining the straw in a steam pressurized refiner;

(d) mixing the straw fibers with a UF or MUF resin; and (e) pressing the straw fiber/resin mixture into boards or panels.

Preferably, the steam pressure is above about 6.0 bar, more preferably above about 8.0 bar and most preferably above about 10.0 bar. The straw may be mechanically refined with a specific energy consumption of less than about 500 kWh per ton of oven dry straw and preferably less than about 300 kWh per ton of oven dry straw. In one embodiment, the method may further comprise the step of adding an acid to said straw fibres after refining the straw and prior to mixing the straw fiber with the resin.

In another aspect, the invention may comprise a method of producing straw fibre for use in producing boards or panels, comprising digesting and/or refining the straw under elevated steam pressure until the straw pH reaches below about 5.5, and preferably below about 5.0.

In another aspect, the invention comprises a method of producing binderless boards or panels comprising cereal straw, said method comprising the steps of:

(a) hammermilling the straw, preferably but not necessarily to lengths less than about 50 mm and more preferably to lengths less than about 25 mm;

(b) treating the straw with steam under elevated pressure;

(c) mechanically refining the straw in a steam pressurized refiner to produce straw fiber; and (d) pressing the straw fiber into boards or panels.

The steam pressure in the pressure refiner may be greater than about 8.0 bar, and preferably above about 9.0 bar, and more preferably above about 10.0 bar.

In another aspect, the invention may comprise binderless boards produced by the methods of the present invention.

DETAILED DESCRIPTION OF THE INVENTION

The present invention provides for a method of processing cereal straw to produce straw fibre for use with UF and MUF resins or in a binderless process. When describing the present invention, terms not defined herein have their common art-recognized meanings. Cereal straw comprises straw collected from cereal grain crops and includes but is not limited to wheat, oats, barley, rice and rye. The word "about" refers to a range of plus or minus 10% of the stated value.

The methods of the present invention comprise a step of contacting the straw with pressurized steam during either or both digesting or refining of the straw. The resulting fibres are suitable for use with UF based resins, including UF and melamine urea formaldehyde (MUF), or are suitable for use in binderless boards or panels.

The straw is preferably hammermilled to reduce the straw to suitable lengths, preferably less than about 50 mm and greater than 12 mm. Lengths less than 25 mm are preferred and even more preferably less than about 20 mm or less. Ideally, the straw length falls between about 12 to about 25 mm. Other means for cutting the straw into suitable lengths may be used, such as straw slicers or forage choppers. The cut or hammermilled straw may then screened to remove extremely fine fibres or larger fibres. The milled and screened fibres may then be washed with water to rinse out dirt and small foreign objects and to wet the straw, which may raise the moisture content of the straw. Alternatively, the straw may be rinsed or wetted prior to cutting or hammermilling. Preferably, the straw has a moisture content of about 30% prior to steam treatment.

Figure 1:
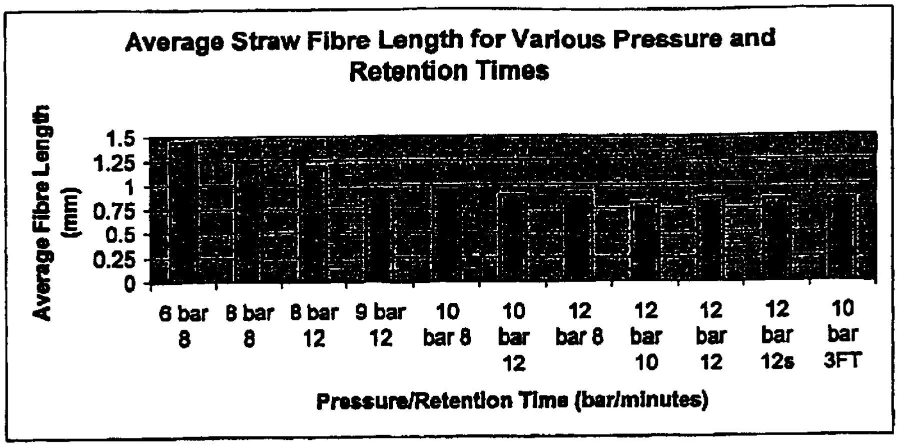
FIG. 1 is a bar graph showing average straw fibre length as a function of refining pressure and retention time.

It is believed by some that straw must be soaked in water for extended periods of time prior to hammermilling or slicing. However, in the present invention, it is not necessary to soak the straw. In FIG. 1, the data point labelled 12, 12*s* (second from the right) was obtained from straw which had been soaked in water for four hours prior to hammermilling. As may be seen, the presoaking had no effect on fiber length after steam pressure refining.

After the straw has been wetted and hammermilled, it is then fed, by way of a plug screw feeder, into a steam digester where it is preferably subjected to an initial steam pretreatment. The steam pressure is preferably greater than about 6.0 bar, more preferably greater than about 8.0 bar and most preferably greater than about 10.0 bar. We have found that useful straw fibre results even at pressures of 12.0 bar or higher.

An essential element of the invention is contacting the straw with high pressure steam during a digesting or straw softening step or during refining, or preferably during both digesting and refining. From the steam digester, the straw may then be directed to a steam pressurized mechanical refiner. Suitable refiners are well known in the art. Steam pressure refining results in a more fibrillated material than atmospheric refining. In either instance, the refining takes place with low specific energy consumption as compared to refining of wood fibre in an equivalent process. Typically, the specific energy consumption may be less than 300 kWh per ton of oven-dry straw, preferably less than about 200 kWh per ton of oven-dry straw and most preferably less than about 100 kWh per ton of oven-dry straw. Therefore, in a preferred embodiment, the straw is reduced to the desired end product through a severe steam treatment during mechanical refining under mild mechanical conditions.

In a preferred embodiment, the straw is subject to high-pressure steam in the digester and in the refiner. In a laboratory scale digester-refiner, the cumulative duration of the steam treatment is preferably greater than about 3 minutes and more preferably greater than about 5 minutes. It will be obvious to those skilled in the art that dwell time in a steam pressurized digester and refiner may be shortened in larger, commercial scale apparatuses. More severe steam treatment (higher pressure, greater duration) results in a more fibrillated, darker material. The steam treatment may take place in any pressurized vessel and may include a continuous digester that includes a screw-type augur to move the straw through the digester and into the refiner.

In one embodiment, a fibre brightening agent may be added to the fibre during the refining process. Suitable brightening agents include, but are not limited to, hydrogen peroxide or sodium bisulphate.

Without being restricted to a theory, it is believed that the steam treatment of the present invention, both as a pretreatment and during refining, forms strong and weak acids on the straw surface, most likely by cleaving carboxyl groups. As a result, the pH and buffering capacity of the straw is lowered. Prior art theories that acid treatment stripped the wax and silica content of the straw surface appear not to be correct. It is believed that the lower pH and buffering capacity makes for a more amenable environment for UF resin chemistry to occur. Based on this theory, the use of acid treatment and/or steam treatment of straw would have no beneficial effect, and would likely have a deleterious effect, on the use of phenolic resins such as phenol formaldehyde resins, which work better in alkaline conditions.

In testing, we have found that straw fibre pH decreases with more severe steam treatment, both in pressure and duration. In one embodiment, the refining process produces straw fibre having a pH less than about 5.5 and preferably less than about 5.0. The pH of the straw fibre may provide one indicator of the level of fibrillation which is occurring and permits one to gauge whether or not the severity of the steam treatment may be increased or decreased.

Figure 2:
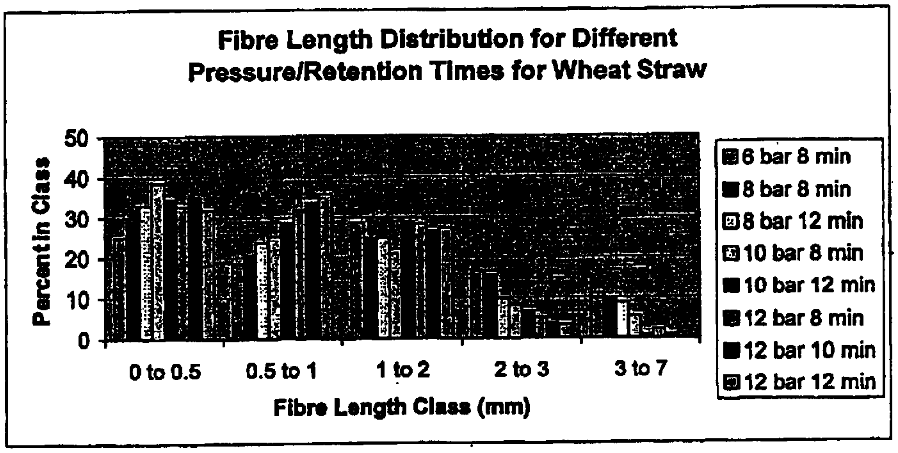
FIG. 2 is a bar graph showing fibre length distribution as a function of refining pressure and retention time.

We have also found that steam pressure during refining affects fibre length. Desirable straw fibre is between about 0.5 mm and 2.0 mm. Fibres longer than 2.0 mm (shive) are not as desirable. Fibres shorter than 0.5 mm are classified as debris. As seen in FIGS. 1 and 2, although debris increases with increasing pressure, debris levels do not appreciably increase beyond about 9.0 bar of pressure. At the same time, the proportion of fibres longer than 3.0 mm decreases while the proportion of desirable fibres in the range of about 0.5 mm to about 2.0 mm increases. It is believed that this increase of proportion of fibres of a desirable length is also responsible in part for the beneficial results herein disclosed. One skilled in the art may also achieve optimal straw fibre length results by varying the steam pressure and refiner retention times, with minimal experimentation. At higher steam pressures or in larger refiners, shorter digester-refiner retention times are possible.

One skilled in the art may, with minimum experimentation, use various combinations of steam pressure, refiner retention time and refiner size to achieve desirable results. At higher steam pressure, shorter digester/refiner retention times are possible. At 6.0 bar of steam pressure, it is likely that digester/refiner retention times in excess of 8 minutes may be preferred. At 12.0 bar, refiner retention times may be less than about 3 minutes. As well, as is well known in the art, larger refiners may be used to shorten retention times, with equivalent results. In FIG. 1, the data point labelled 10 bar, 3 FT indicates the use of a refiner almost double the size of the refiner used to produce the other data points. The average fibre length in that case (10 bar for 3 minutes) was approximately equal to treatment in the smaller refiner at 12 bar for 12 minutes.

In one embodiment, an acid may be added to the straw fibres after refining to further enhance UF or MUF bonding. The acid may be sprayed onto the straw fibres using a rotary blender and the straw fibres may be allowed to sit for about 15 minutes prior to resin addition. Appropriate acids may include acetic acid, hydrochloric acid, formic acid, propionic acid, carbonic acid or citric acid.

The methods of the present invention may produce straw fibre of sufficient quality to produce binderless boards or panels.

EXAMPLES

The following examples are representative of the claimed invention and are not intended to be limiting thereof.

Example 1

Straw was milled, atmospherically refined or steam pressure refined as shown in Table 1 below:

TABLE 1

Straw fibre preparation methods

| Type | Process |
|---|---|
| M (milled straw) | Hammermilled to 20 mm length then refined dry in PSKM mill. >10 mesh and <80 mesh fibres removed. |
| AR (atmospherically refined straw) | Hammermilled straw wet to 30% moisture content then refined in a Sprout Bauer 300 mm (12 in.) atmospheric refiner. |
| PR (pressure refined straw) | Hammermilled straw wet to 30% moisture content then refined in 900 mm (36 in.) Andritz Pressurised Refiner. Pre-steamed at 483 kPa (70 psi) for two (2) minutes. |

Specific energy consumption during refining was about 250 kWh per ton of oven dry straw.

TABLE 2

Workplan for fibre comparison study on 432 mm × 482 mm (17 in. × 19 in.) panels

| Group ID | Target Values Thickness (mm/in.) | Target Values Density (kg/m³/lb/ft³) | Resin Content (%) | Straw Type | Acid Treatment (all sprayed) |
|---|---|---|---|---|---|
| M1 | 20 (0.787) | 768 (48) | 12% MUF | Milled | None |
| M2 | 20 (0.787) | 768 (48) | 12% MUF | Milled | 2.5% acetic |
| M3 | 20 (0.787) | 768 (48) | 12% MUF | Milled | 0.5% hydrochloric |
| PR1 | 20 (0.787) | 768 (48) | 12% MUF | Pressure refined | None |
| PR2 | 20 (0.787) | 768 (48) | 12% MUF | Pressure refined | 2.5% acetic |
| PR3 | 20 (0.787) | 768 (48) | 12% MUF | Pressure refined | 0.5% hydrochloric |
| AR1 | 20 (0.787) | 768 (48) | 12% MUF | Atmospherically refined | None |

Where acid was added to the straw, it was sprayed onto the straw fibres with a rotary blender prior to resin addition. At least a fifteen minute waiting period between acid addition and resin addition was observed. The amount of acid added is indicated as a percentage of oven dry straw weight. The straw fibre was dried to about 2% moisture content prior to acid addition.

TABLE 3

Internal bond data for fibre comparison study (3 panels, 6 samples per panel)

| Group ID | Average Density (kg/m³/lb/ft³) | Internal Bond (MPa/psi) |
|---|---|---|
| M1 (milled, no acid) | 710 (44.4) | 0.157 (22.8) |
| M2 (milled, acetic acid) | 726 (45.4) | 0.063 (9.1) |
| M3 (milled, HCl) | 794 (49.6) | 0.126 (18.3) |
| PR1 (p. ref., no acid) | 794 (49.6) | 1.020 (148.0) |

TABLE 3-continued

Internal bond data for fibre comparison study (3 panels, 6 samples per panel)

| Group ID | Average Density (kg/m³/lb/ft³) | Internal Bond (MPa/psi) |
|---|---|---|
| PR2 (p. ref., acetic acid) | 808 (50.5) | 0.944 (136.9) |
| PR3 (p. ref., HCl) | 802 (50.1) | 0.965 (140.0) |
| AR1 (atm. ref., no acid) | 778 (48.6) | 0.436 (63.2) |

As may be seen, pressure refining, with or without the addition of acid, resulted in panels which easily exceed the minimum ANSI MDF standard of 0.620 Mpa (90 psi).

Example 2

In another example of the process, wet straw having a moisture content of about 30% was hammermilled to lengths of about 20 mm and was steam-pressure treated and then refined in a 560 mm Andritz pressure refiner. The steam pressure was set at either 600 kPa or 1000 kPa for 5 minutes. Specific energy consumption was about 250 kWh per ton of oven-dry straw. The straw fibres were then pressed into homogenous boards having a target thickness of 15.9 mm and a target density of 736 kg/m$^3$ (46 lb/ft$^3$). The resin (10% UF or MUF) was mixed with the fibres using a paddle-shear blender. No wax was added. Pressing temperature was 200° C. (392° F.) for 250 seconds. Table 4 identifies relevant fibre treatment parameters and the resulting internal bond strengths of the panels formed:

TABLE 4

| Fibre Sample | Steam Pressure | Acid Treatment | Bond Strength - MUF (Mpa/psi) | Bond Strength - UF (MPa/psi) |
|---|---|---|---|---|
| 1 | 600 kPa | No | 1.018 (147.7) | 0.867 (125.8) |
| 2 | 1000 kPa | No | 0.771 (111.8) | 1.105 (160.3) |
| 3 | 600 kPa | 2% acetic acid (before refining) | 0.986 (143.0) | 1.074 (155.7) |
| 4 | 600 kPa | 2% acetic acid (after refining) | 0.865 (125.4) | 0.616 (89.4) |
| 5 | 600 kPa | 1% citric acid (after refining) | — | 0.963 ((139.7) |
| 6 | 600 kPa | 0.5% citric acid (after refining) | 1.160 (168.2) | 0.980 (142.2) |

In every case with one exception, the internal bond value exceeded the minimum ANSI MDF standard of 0.620 Mpa (90 psi). Optimization of the process to achieve high bond strength may be achieved by varying steam pressure and/or duration, and addition of acid treatment to the straw fibre. There is an optimal level of acidity for UF resin chemistry, depending on the specifications of the resin used, which may be modified. If the conditions are too acidic, then UF resin bonding may be impaired as indicated by results which show that the addition of acid to steam-pressure treated straw, where the acid is added after refining, results in panels having lower internal bonding strength than panels which were only steam-pressure treated and were not subjected to post-refining acid treatment. However, we have found that with UF resins, the use of citric acid did result in higher internal bond values than with panels made from steam-pressure treated straw without acid, whereas the use of acetic acid degraded bond values. Still higher bond values were obtained without acid treatment but with higher steam pressure and duration of steam treatment. With MUF resins, we found that the highest bond values were obtained at a more moderate steam pressure and with the addition of a dilute citric acid solution following refining of the straw.

Example 3

This data provides evidence that the improved UF resin binding seen with high pressure steam refining are a result of reduced straw fibre pH.

TABLE 5

Refiner Steam Pressure, Retention Time and Straw Fibre pH
Relationship between refiner steam pressure, refiner retention time and resultant wheat straw fibre pH (normal straw pH 7.5 to 8.0)

| Steam Pressure (kPa) | Refiner Retention Time (sec) | Fibre pH |
|---|---|---|
| 0 (atmospheric) | N/A | 7.78 |
| 200 | 180 | 6.55 |
| 500 | 180 | 6.37 |
| 500 | 600 | 5.56 |
| 600 | 300 | 6.23 |
| 800 | 180 | 5.77 |
| 1000 | 180 | 5.35 |
| 1000 | 300 | 5.17 |
| 1200 | 240 | 4.94 |

Example 4

As shown in FIGS. 1 and 2, straw fibre length was measured for refining processes at various pressures and durations. The steam refining was measured at 6.0 bar and 8 minutes of refiner retention time at the lower end of severity, and 12.0 bar and 12 minutes at the higher end. In FIG. 1, a single data point at 10.0 bar for 3 minutes is shown, but was obtained using a much larger refiner (Forintek 560 mm), nearly double the size of the refiner used to obtain the other data.

Example 5

Binderless Board

Wheat (CWRS) straw chopped to a nominal length of 12 mm was introduced into a 12" refiner at a moisture content of less than 10%. Refiner feed water is introduced at a rate of 300 ml per minute to the feed hopper to produce a fibre plug in the plug screw feeder. Excess water is removed at the plug screw feeder as squeeze water when the plug is formed. The chopped straw was refined at a pressure of 12 Bar (1200 kPa) and cooker retention time of 12 minutes was used. The fibre was refined at a throughput of approximately 29.3 kg/hr with a specific energy consumption of 12.0 kWh/oven dry tonne on this particular run. The fibre was then blow line dried to a moisture content of less than 9% for transportation and storage.

After the fibre was stored until a moisture content of 3.2% at 20° C. room temperature was achieved (this step is not necessary in producing a binderless boards, it is preferable to use hot fresh fibre), the fibre was formed into a mat and preheated to 60° C. before being introduced to a heated platen press. No binders were applied to the material before or after the mat was formed.

The mat was pressed to a target thickness and a target density of 8.3 mm and 864 kg/m$^3$ respectively. The press temperature was 186 C and the total pressing time was 6 minutes. The panel was tested to ANSI A208.2-1994 for internal bond and CSA 0437.1-93 for Modulus of Rupture/Modulus of Elasticity (MOR/MOE). The results of the panel test are as follows in Table 6:

TABLE 6

Physical Properties of Binderless Board

| Property | Binderless Panel Value | ANSI A208.2 MDF "MD" Standard |
|---|---|---|
| Internal Bond (Mpa) | 1.74 | 0.60 |
| MOE (Mpa) | 18.4 | 24.0 |
| MOE (Mpa) | 2524 | 2400 |

References

The following references are incorporated herein as if reproduced herein in their entirety.

Groner, R. R. and Barbour, J. F., 1971. Straw particleboard an engineering and economic analysis. Department of Agriculture of Chemistry Report, Oregon State University, Corvallis, Oreg. USA.

Groner, R. R. and Barbour, J. F., 1972. Particleboard made from straw/wood blends. Department of Agriculture of Chemistry Report, Oregon State University, Corvallis, Oreg. USA.

Groner, R. R. and Barbour, J. F., 1973. The polyisocyanate straw particleboard process. Department of Agriculture of Chemistry Report, Oregon State University, Corvallis, Oreg. USA.

Kostiw, D. J., Process for the Production of Articles from Treated Lignocellulosic Particles and Binder, CA Patent Application 2,250,645.

Manitoba Government, 1995. Straw based particleboard test results. Manitoba Government Industry, Trade and Tourism, Winnipeg, MB, Canada October 1995.

Markessini, E., Roffael, E. and Rigal, L., 1997. Panels from annual plant fibers bonded with urea formaldehyde resins. Proceedings of the $31^{st}$ International Particle Board/ Composite Materials Symposium, Washington State University, Pullmann, Wash., USA 1997.

Nakos, P., 1999. Manufacture of composite boards. WIPO publication number WO99/02318.

Saskatchewan Government, 1987. Straw particleboard. Saskatchewan Department of Agriculture Development Fund. Report prepared by Solutions Management Group, Inc. Dec. 14, 1987.

Sauter, S. L., 1995. Developing high quality composites from urban waste wood and wheat straw using urea formaldehyde resin. Master's Thesis, Washington State University, Department of Mechanical and Materials Engineering, August 1995.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A method of producing boards or panels comprising cereal straw, said method comprising the steps of:

(a) cutting the straw crosswise;

(b) treating the straw with steam under elevated pressure;

(c) mechanically refining the straw in a steam pressurized refiner;

(d) mixing the straw fibers with a UF or MUF resin; and (e) pressing the straw fiber/resin mixture into boards or panels.

2. The method of claim 1 wherein said steam pressure in either step (b) or step (c), or both, is above about 600 kpa.

3. The method of claim 2 wherein said steam pressure is above about 800 kPa.

4. The method of claim 3 wherein said steam pressure is above about 1000 kPa.

5. The method of claim 1 wherein the straw is cut by being hammermilled to lengths less than about 25 mm.

6. The method of claim 1 wherein the straw is mechanically refined with a specific energy consumption of less than about 500 kWh per ton of oven dry straw.

7. The method of claim 6 wherein the straw is mechanically refined with a specific energy consumption of less than about 300 kWh per ton of oven dry straw.

8. The method of claim 1 further comprising the step of adding an acid to said straw fibres after refining the straw and prior to mixing the straw fiber with the resin.

9. A method of producing boards or panels comprising cereal straw, said method comprising the steps of:

(a) cutting the straw crosswise to lengths less than about 25 mm;

(b) treating the straw with steam under pressure in excess of about 1000 kPa;

(c) mechanically refining the straw in a steam pressurized refiner; and (d) pressing the straw fiber into boards or panels, without binder.

10. The method of claim 9 wherein the straw is mechanically refined with a specific energy consumption of less than about 500 kWh per ton of oven dry straw.

11. The method of claim 10 wherein the straw is mechanically refined at an intensity of less than about 300 kWh per ton of oven dry straw.

12. A board formed without added binder and comprising straw fibre produced from straw treated with steam under pressure in excess of about 1000 kPa and mechanically refined in a steam pressurized refiner.

13. A method of producing boards or panels comprising cereal straw, said method comprising the steps of:

(a) cutting the straw crosswise;

(b) treating and mechanically refining the straw with steam under elevated pressure until the straw fibre pH is less than about 5.5;

(c) pressing the straw fiber into boards or panels, with added UF or MUF binder, or without an added binder.

14. The method of claim 12 wherein the straw is treated and refined with steam under elevated pressure until the straw fibre pH is less than about 5.0.

15. The method of claim 13 wherein the straw fiber is pressed into boards or panel without added resin or binder.

* * * * *